United States Patent Office 2,834,978
Patented May 20, 1958

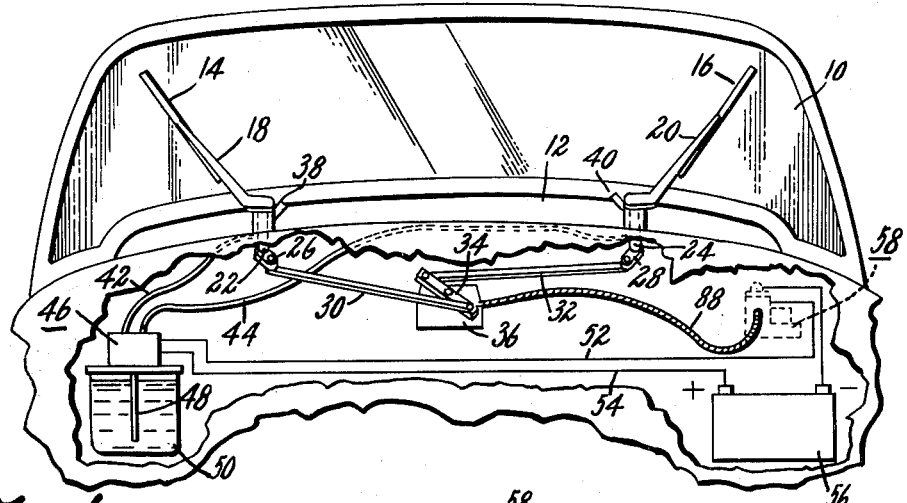
May 20, 1958     W. D. HARRISON     2,834,978
COORDINATED CONTROL MEANS FOR VEHICLE
WINDSHIELD WIPER AND WASHER
Filed July 11, 1955     2 Sheets-Sheet 1
INVENTOR.
WALTER D. HARRISON
BY
S. H. Strickland
HIS ATTORNEY

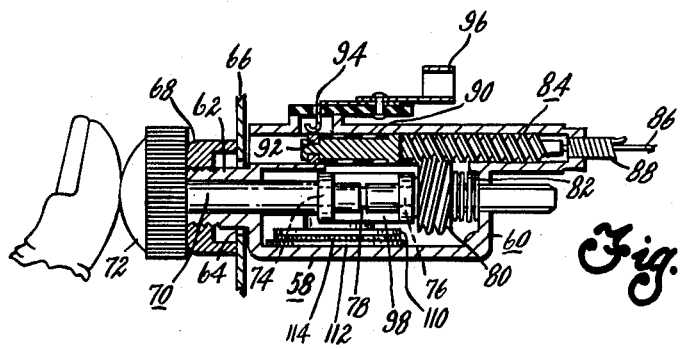
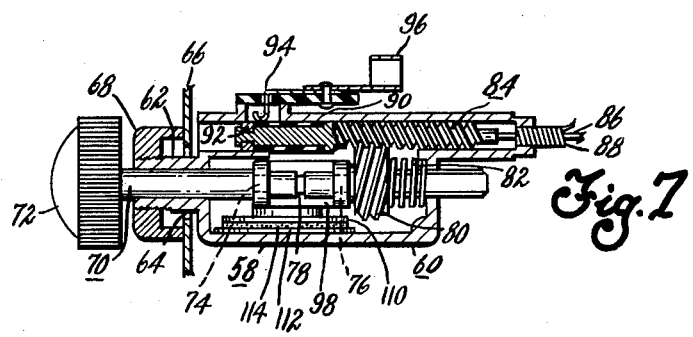
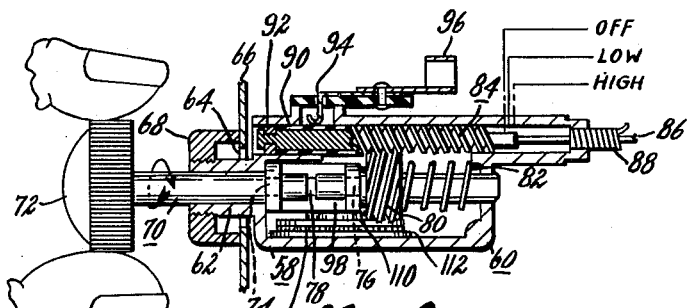
INVENTOR.
WALTER D. HARRISON
BY
HIS ATTORNEY

2,834,978

COORDINATED CONTROL MEANS FOR VEHICLE WINDSHIELD WIPER AND WASHER

Walter D. Harrison, Rochester, N. Y., assignor to General Motors Corporation, Detroit, Mich., a corporation of Delaware Application July 11, 1955, Serial No. 521,177

11 Claims. (Cl. 15—250.4)

This invention pertains to the art of windshield cleaning, and particularly for means for coordinating operation of windshield wiper and washer mechanisms.

Heretofore, it has been proposed to provide some means for actuating a wiper motor concurrently with a washer pump motor and deactivating the wiper motor after operation of the pump has terminated. In this manner, operation of the liquid solvent applying means and the wiping means will be coordinated. The present invention relates to a wiper-washer coordinated control wherein the washer pump motor is of the electrically operated type. Accordingly, among my objects are the provision of wiper-washer control means for effecting coordinated operation thereof; the further provision of a wiper-washer control assembly including means for automatically timing operation of the wiper; and the still further provision of wiper-washer control means including means for autuating the wiper independently of the washer.

The aforementioned and other objects are accomplished in the present invention by utilizing a single control knob for effecting washer and/or wiper operation. Specifically, the coordinated control means for use with an electrically operated washer pump of the type well known in the art wherein the intake stroke of the pump is effected by energization of a solenoid motor, and delivery stroke of the pump is effected by resilient means which are compressed during the intake stroke. The wiper motor may be of the vacuum, hydraulic or electric type. The control means includes a housing within which a control shaft is rotatably journaled, the control shaft also being capable of axial movement relative to the housing. A ratchet tooth rack is resiliently carried by the control shaft, the rack meshing with a ratchet gear, such that during inward axial movement of the shaft and rack, rotation will not be imparted to the ratchet wheel. However, upon outward axial movement of the shaft and rack, rotation will be imparted to the ratchet wheel.

The ratchet wheel may be integral with a transversely extending shaft journaled in the housing and is formed with an integral flange portion constituting a disc. The housing supports a stationary disc in alignment with the ratchet wheel disc, which may be composed of nylon, and a layer of silicone is disposed between the two relatively rotatable discs. Inasmuch as silicone has a high viscosity, it will produce a dashpot effect by retarding relative rotation between the disc so as to time operation of the wiper during conjoint operation of the washer and wiper.

The control shaft also carries a worm gear which meshes with an axially movable worm shaft. The worm shaft is connected to one end of a control wire which is supported in a Bowden conduit, and by imparting longitudinal movement to the control wire, the wiper motor may be activated or inactivated. In addition, the worm shaft includes insulated and electrically conductive portions for controlling energization of the electric washer pump.

In order to effect wiper operation alone, the control knob is rotated, thereby rotating the control shaft and worm gear. In this manner, the worm shaft is moved axially and imparts longitudinal movement to the control wire of the Bowden cable to activate the wiper motor. When coordinated washer-wiper operation is desired, the control knob is moved axially inward, or depressed, wherein the worm shaft is moved axially to activate the wiper motor and also close the energizing circuit for the washer pump motor. When the control shaft is moved axially inward, a spring is compressed, which spring tends to move the control shaft axially outward to the extended position when the operation releases the knob. However, the timing means constituted by the ratchet wheel disc, the stationary disc, and the silicone layer, retards outward axial movement of the control shaft so that wiper operation will be continued until the discharge of liquid solvent terminates.

Further objects and advantages of the present invention will be apparent from the following description, reference being had to the accompanying drawings wherein a preferred embodiment of the present invention is clearly shown.

In the drawings:

Fig. 1 is a fragmentary view, with certain parts broken away, the motor vehicle equipped with the coordinated control means of this invention.

Fig. 2 is a fragmentary view, partly in elevation and partly in section, of the coordinated control means.

Fig. 3 is a sectional view taken along line 3—3 of Fig. 2.

Figs. 4 and 5 are sectional views taken along lines 4—4 and 5—5 of Fig. 3.

Fig. 6 is a view similar to Fig. 3 with the control knob depressed.

Fig. 7 is a view similar to Fig. 6 with the control knob released.

Fig. 8 is a view similar to Fig. 3 indicating the manner in which wiper operation alone is effected.

With particular reference to Fig. 1, the vehicle is shown having a windshield 10, and a cowl 12. The windshield cleaning mechanism for the vehicle includes a pair of oscillatable wiper blades 14 and 16, which are detachably carried by arms 18 and 20, respectively. The arms 18 and 20 are drivingly connected with transmission shafts 22 and 24, respectively, which are connected by crank arms 26 and 28 to links 30 and 32. The links 30 and 32 are connected to opposite ends of a double-acting oscillatory crank 34 driven by a wiper motor 36 which may be of the vacuum, hydraulic or electric type. When the motor 36 is operating, the wiper blades 14 and 16 will move asymmetrically across the outer surface of the windshield 10. The cleaning mechanism also includes a pair of washer nozzles 38 and 40 located proximate the transmission shafts 22 and 24 for discharging liquid solvent onto the windshield in the paths of the moving wiper blades 14 and 16. The nozzles 38 and 40 are connected by flexible conduits 42 and 44, respectively, with the delivery side of a washer pump 46. The washer pump disclosed herein is of the type having electrical motor means, such as a solenoid, for effecting the intake stroke and spring means for effecting the delivery stroke. The pump includes a pick-up tube 48 which is submerged in a reservoir 50. The pump 46 is connected by electrical wires 52 and 54 to a battery 56 through the coordinated control means, generally indicated by the numeral 58.

With particular reference to Figs. 2 through 5, the construction of the coordinated control means 58 will be described in detail. The control means includes a housing 60 having a tubular, bearing extension 62, which extends through an aperture 64 in the instrument panel 66 of the vehicle. The extension 62 is threaded and receives an escutcheon nut 68 for rigidly connecting the housing 60 to the instrument panel 66. The housing extension 62 supports a control shaft 70 for rotation and axial movement relative thereto. The outer end of the control shaft has attached thereto a suitable knob 72.

The control shaft is formed with a pair of axially spaced annular grooves 74 and 76, between which a third annular groove 78 is formed. The control shaft 70 has attached thereto a worm 80 and is spring biased outwardly by means of a coil spring 82 which encompasses the shaft 70, opposite ends of the spring 82 engaging the worm 80 and the housing 60. The worm 80 meshes with a worm shaft 84 supported for axial movement within the housing 60.

The outer end of the worm shaft 84 is connected to one end of a control wire 86 enclosed by a Bowden conduit 88. The other end of the control wire 86 is connected to the control device for the wiper motor 36, which comprises a valve in the case of a vacuum or hydraulic motor and a switch in the case of an electric motor. The inner end portion of the worm shaft 84 carries an insulating sleeve 90 and an electrical contact 92. The housing 60 supports a spring contact 94, which is connected to a terminal 96 and, thence, to wire 52 and the motor of the washer pump 46. The housing carried contact 94 normally engages the insulating sleeve 90 and, thus, the circuit to the washer pump motor is open. However, when the control knob 72 is fully depressed, as indicated in Fig. 6, the contact 92 is moved to engagement with the contact 94 so as to complete the electrical circuit to the pump 46.

With particular reference to Figs. 4 and 5, it will be seen that the intermediate portion of a spring yoke 98 is received in the annular groove 78 of the control shaft. Opposite ends of the spring yoke 98 engage the under surface of a ratchet to the rack 100. The ratchet to the rack 100 is formed with a pair of downwardly extending, apertured legs 102 and 104, which are received by the annular grooves 74 and 76 of the shaft 70. The arrangement is such that the control shaft 70 may be rotated relative to the rack 100. Thus, the spring yoke 98 yieldingly supports the ratchet tooth rack 100 so as to permit slight downward movement thereof, as viewed in Fig. 4, during inward axial movement of the shaft 70. However, during outward axial movement of the shaft 70, the spring yoke 98 maintains the ratchet tooth rack in operative engagement with a ratchet wheel 106, which is integral with a transversely extending stub shaft 108. The stub shaft 108 is journaled within the housing 60 and is formed with a radially extending flange 110 constituting a disc. Preferably, the ratchet wheel 106 is composed of nylon, and the disc is disposed in alignment with a stationary disc 112 threaded into the housing 60. A layer of silicone 114 is disposed between the relatively rotatable flange 110 and the disc 112, the silicone having a relatively high viscosity and thereby producing a dashpot effect for timing operation of the wiper during coordinated washer-wiper operation.

*Operation*

With particular reference to Figs. 6 through 8, operation of the coordinated control means of this invention will be described. When the control knob 72 is fully depressed into engagement with the escutcheon nut 68, as viewed in Fig. 6, the control shaft 70 will be moved axially inward. Axial inward movement of the control shaft 70 will impart inward axial movement to the worm shaft 84 through the worm 80 throughout a distance equal to that of displacement shaft 70. Thus, the wiper motor 36 will be activated through the control wire 86 at high speed, and concurrently therewith the contact 92 will engage the contact 94 so as to energize the electrical motor of the washer pump 46 so as to effect the intake stroke thereof. During inward axial movement of the shaft 70, the rack 100 does not rotate ratchet wheel 106 due to the one-way driving connection therebetween. In moving the control shaft 70 axially inward, the spring 82 is compressed. Accordingly, when the operator releases the control knob 72, the spring 82 tends to move the control knob 70 axially outward to the position depicted in Fig. 3. However, since axially outward movement of the control shaft 70 is accompanied by axial outward movement of the worm shaft 84 and clockwise rotation of the ratchet wheel 106 through the timing means comprising the relatively rotatable discs 110 and 112, when the worm shaft moves axially outward, the circuit connection to the motor of the pump 46 is immediately interrupted. Accordingly, the delivery stroke of the pump will be initiated and liquid solvent will be discharged onto the windshield into the path of the moving wiper blades 14 and 16. The dashpot effect of the discs 110 and 112, as controlled by the silicone layer 114, is adjusted so as to be substantially equal to, or slightly greater than, the time required to complete the delivery stroke of the pump 46. When the spring 82 has moved the control shaft 70 and the worm shaft 84 from the positions depicted in Fig. 7 to the positions depicted in Fig. 3, wiper operation will be discontinued, preferably slightly after the delivery stroke of the pump has been completed.

To operate the wiper alone, the control knob 72 is rotated in a clockwise direction, as viewed in Fig. 8, thereby rotating the worm 80 so as to impart outwardly axial movement to the worm shaft 84. In this manner, axial movement is imparted to the control wire 86, thereby activating the wiper motor 36. When the control knob 72 is rotated in a counterclockwise direction, as viewed in Fig. 8, the worm shaft 84 and the control wire 86 will be moved axially inward so as to deactivate the wiper motor 36.

Another feature of the control means of this invention resides in the fact that after the control knob 72 has been rotated to select the desired wiper motor speed, the knob can be depressed to actuate the washer pump motor. Upon releasing the knob, the washer pump will discharge liquid solvent onto the windshield into the paths of the moving wipers now operating at high speed. After completion of the wash cycle, the worm shaft 84 will automatically return to the preset position where the wiper motor operates at the preselected speed.

From the foregoing, it is apparent that the present invention provides simplified coordinated control means for actuating either a wiper motor alone or concurrently with a washer pump. Moreover, the control means of this invention are universally adaptable with any vehicle cleaning system having an electrical washer pump and any type of conventional wiper motor.

While the embodiment of the present invention as herein disclosed, constitutes a preferred form, it is to be understood that other forms might be adopted.

What is claimed is as follows:

1. A joint control for a windshield wiper motor and a windshield washer pump motor, said washer pump motor having an intake stroke and a delivery stroke comprising, a housing, a control shaft rotatably journaled in said housing and capable of axial movement relative thereto, means operatively connected to the shaft and actuated by either rotation or axial movement thereof for controlling operation of the wiper motor, means operatively connected to said shaft and actuated only upon a predetermined axial movement thereof for controlling operation of the washer pump motor to effect the intake stroke thereof, resilient means operatively connected with said shaft so as to be stressed upon axial movement thereof in one direction for effecting axial movement of said shaft in the opposite direction, and means operatively connected with said shaft for retarding axial movement thereof by said resilient means to thereby time the operation of said wiper motor after completion of the delivery stroke of the washer pump motor.

2. A joint control for a windshield wiper motor and a windshield washer pump motor, said washer pump motor having an intake stroke and a delivery stroke, comprising, a housing, a control shaft rotatably journaled in said housing and capable of axial movement relative thereto, means operatively connected to the shaft and actuated by either rotation or axial movement thereof for controlling operation of the wiper motor, means operatively connected to said shaft and actuated only upon a predetermined axial movement thereof for initiating operation of said washer pump motor to effect the intake stroke thereof, resilient means operatively connected with said shaft so as to be stressed upon axial movement thereof in one direction for effecting axial movement of said shaft in the opposite direction to immediately terminate operation of said washer pump motor, and means operatively connected with said shaft for retarding axial movement thereof by said resilient means to thereby time the operation of said wiper motor after completion of the delivery stroke of the washer pump motor.

3. A joint control for a windshield wiper motor and a windshield washer pump motor, comprising, a housing, a control shaft rotatably journaled in said housing and capable of axial movement relative thereto, means operatively connected to the shaft and actuated by either rotation or axial movement thereof for controlling operation of one motor, means operatively connected to said shaft and operated only upon axial movement thereof for controlling operation of the other motor, a spring operatively connected with said shaft so as to be stressed upon axial movement thereof in one direction and capable of effecting axial movement of said shaft in the opposite direction, and means operatively connected with said shaft for retarding axial movement thereof by said resilient means to thereby time the operation of said one motor, said last recited means including a pair of relatively rotatable members having a layer of silicone therebetween.

4. A joint control for a windshield wiper motor and a windshield washer pump motor, comprising, a housing, a control shaft rotatably journaled in said housing and capable of axial movement relative thereto, a worm attached to said shaft, means operatively connected with said worm and actuated by either rotation or axial movement thereof for controlling operation of one motor, means operatively connected with said worm and actuated only upon a predetermined axial movement thereof for controlling operation of the other motor, resilient means operatively connected with said shaft so as to be stressed upon axial movement thereof in one direction for effecting axial movement of said shaft in the opposite direction, and means operatively connected with said shaft for retarding axial movement thereof by said resilient means to thereby time the operation of said one motor.

5. A joint control for a windshield wiper motor and a windshield washer pump motor, comprising, a housing, a control shaft rotatably journaled in said housing and capable of axial movement relative thereto, a worm attached to said shaft, a worm shaft operatively engaging said worm whereby either rotation or axial movement of said control shaft will impart axial movement to said worm shaft, means operatively connected to said worm shaft and actuated upon axial movement thereof for controlling operation of one motor, means actuated by a predetermined axial movement of said worm shaft for controlling operation of the other motor, resilient means operatively connected with said control shaft so as to be stressed upon axial movement thereof in one direction for effecting axial movement of said control shaft in the opposite direction, and means operatively connected with said control shaft for retarding axial movement thereof by said resilient means to thereby time the operation of said one motor.

6. A joint control for a windshield wiper motor and a windshield washer pump motor, comprising, a housing, a control shaft rotatably journaled in said housing and capable of axial movement relative thereto, a worm attached to said control shaft, a worm shaft operatively engaging said worm whereby either rotation or axial movement of said control shaft will impart axial movement to said worm shaft, means operatively connected to said worm shaft and actuated by axial movement thereof for controlling operation of one motor, means actuated by a predetermined axial movement of said worm shaft for controlling operation of the other motor, a spring acting constantly upon one worm so as to be stressed upon axial movement thereof in one direction for effecting axial movement of said worm and said control shaft in the opposite direction, and means operatively connected with said control shaft for retarding axial movement thereof by said resilient means to thereby time the operation of said one motor.

7. The joint control set forth in claim 6 wherein said last recited means includes a pair of relatively rotatable members operatively connected to said control shaft, and a layer of silicone disposed between said members.

8. The combination set forth in claim 7 wherein one of said members comprises an annular flange attached to a ratchet wheel, and wherein the operative connection between said one member and said control shaft comprises a rack carried by and axially movable with said control shaft.

9. A joint control for a windshield wiper motor and an electrical windshield washer pump motor, comprising, a housing, a control shaft rotatably journaled in said housing and capable of axial movement relative thereto, means operatively connected to the shaft and actuated by either rotation or axial movement thereof for controlling operation of said wiper motor, switch means operatively connected to said shaft and actuated only upon a predetermined axial movement thereof for energizing said pump motor, resilient means operatively connected with said shaft so as to be stressed upon axial movement thereof in one direction for effecting axial movement of said shaft in the opposite direction to open said switch means, and means operatively connected with said shaft for retarding continued axial movement thereof by said resilient means to thereby time the operation of said wiper motor.

10. A joint control for a windshield wiper motor and an electrical windshield washer pump motor, comprising, a housing, a control shaft rotatably journaled in said housing and capable of axial movement relative thereto, a worm attached to said control shaft, a worm shaft operatively engaging said worm whereby either rotation or axial movement of said control shaft will impart axial movement to said worm shaft, means connected to said worm shaft and actuated by axial movement thereof for controlling operation of said wiper motor, a first electrical contact supported by said housing, a second electrical contact carried by said worm shaft and engageable with said first contact upon a predetermined axial movement of said worm shaft to energize said pump motor, resilient means operatively connected with said control shaft so as to be stressed upon axial movement thereof in one direction for effecting axial movement of said shaft in the opposite direction to separate said contacts to deenergize said pump motor, and means operatively connected with said control shaft for retarding continued axial movement thereof by said resilient means to thereby time the operation of said wiper motor.

11. A joint control for a windshield wiper motor and a washer pump motor, said washer pump motor having an intake stroke and a delivery stroke, including in combination, a manual control member, means operatively connected to said member for concurrently activating said washer pump motor to effect the intake stroke thereof and effecting operation of said wiper motor upon a predetermined movement of said member, means rendered operative by said predetermined movement for repositioning said member to immediately deactivate said washer pump motor to facilitate the delivery stroke thereof while continuing operation of said wiper motor, and means operatively connected with said member for retarding repositioning thereof to continue operation of said wiper motor for a predetermined time interval after completion of the delivery stroke of the washer pump motor.

References Cited in the file of this patent

UNITED STATES PATENTS

| | | |
|---|---|---|
| 2,162,985 | West | June 20, 1939 |
| 2,206,814 | Horton | July 2, 1940 |
| 2,702,918 | Neufeld | Mar. 1, 1955 |

FOREIGN PATENTS

| | | |
|---|---|---|
| 1,083,693 | France | June 30, 1954 |